Aug. 5, 1952

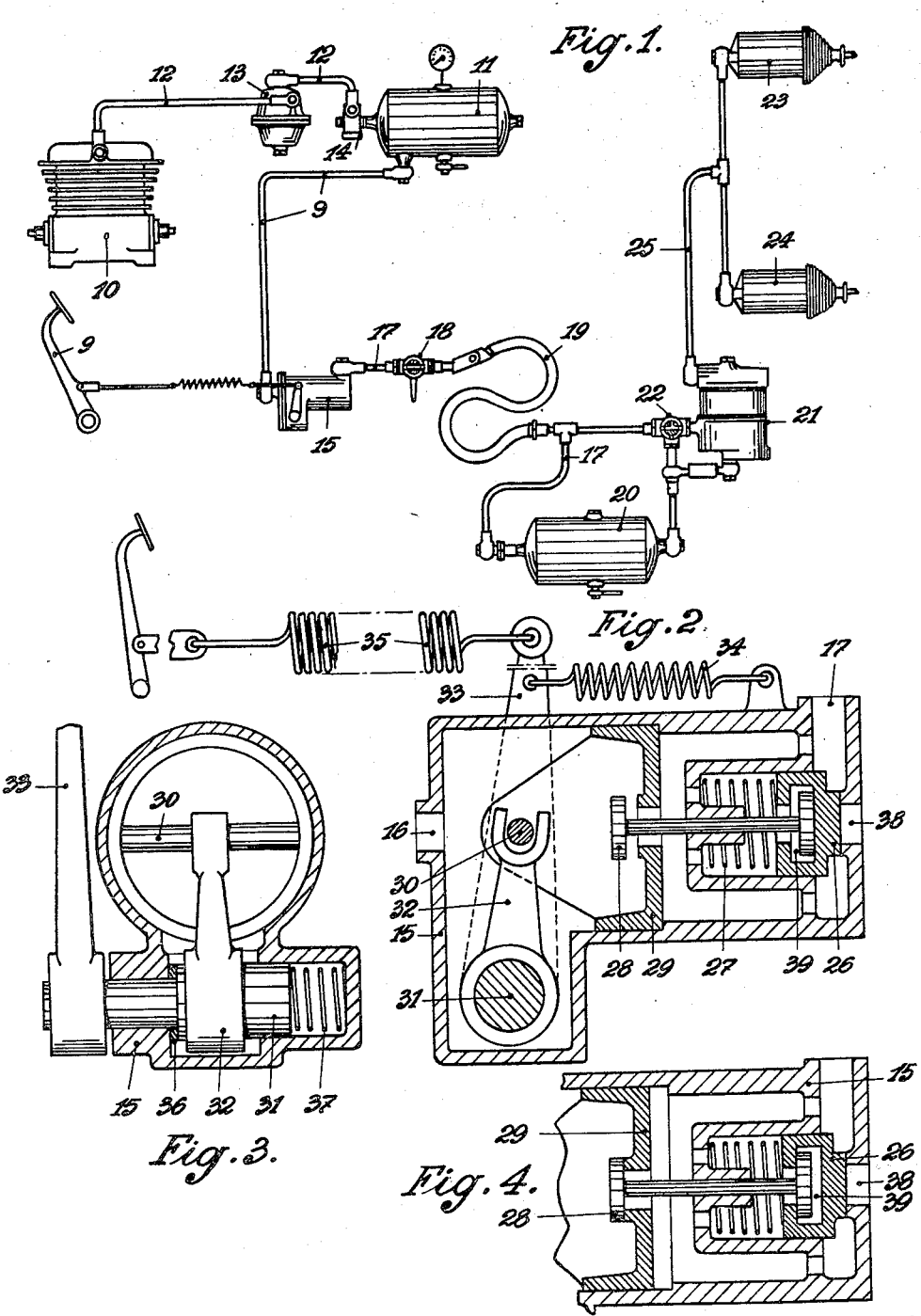

A. DEWANDRE 2,606,077

BRAKE CONTROL VALVE

Filed April 17, 1946

Inventor
A. Dewandre
By

Patented Aug. 5, 1952

2,606,077

UNITED STATES PATENT OFFICE 2,606,077

BRAKE CONTROL VALVE

Albert Dewandre, Brussels, Belgium

Application April 17, 1946, Serial No. 662,900
In Belgium June 19, 1942

Section 1, Public Law 690, August 8, 1946
Patent expires June 19, 1962

1 Claim. (Cl. 303—28)

My invention concerns means for the automatic braking of trailers by means of compressed air and in particular improvements in the control of the reaction distributing valves provided on the tractor and of the emergency valve on the trailer with the object of controlling the brakes and providing automatic action in case of breaking of the couplings.

In hitherto existing arrangements of this nature when a certain amount of braking is applied corresponding to a given position of the brake pedal, the driver is obliged to maintain the pedal in this position without any variation being allowed to avoid unstable braking of the trailer. This instability arises from slight angular movements of the pedal producing an alternative opening and closing of the air escape and admission valves on the distributor with consequent variations in the pressure in the pipe line of the system.

The idea of the invention is to avoid the inconveniences arising from these slight variations of engine torque on the distributor valves and the consequent slight variations of pressure in the pipe system.

The invention consists in providing a certain time lag to the opening or closing of one of the two escape or admission valves with relation to the other by means of a certain clearance provided between the elements connecting the aforesaid valves.

Some examples of what the invention effects will be described in the following description in conjunction with the accompanying drawings, e. g.:

Figure 1 shows diagrammatically an arrangement of an installation for braking trailers.

Figure 2 is a longitudinal section of a reaction distributor comprising the invention.

Figure 3 is a cross-section of the same distributor.

Figure 4 is a detail view of Figure 2 showing a modified position of one of the valves.

Figure 5:
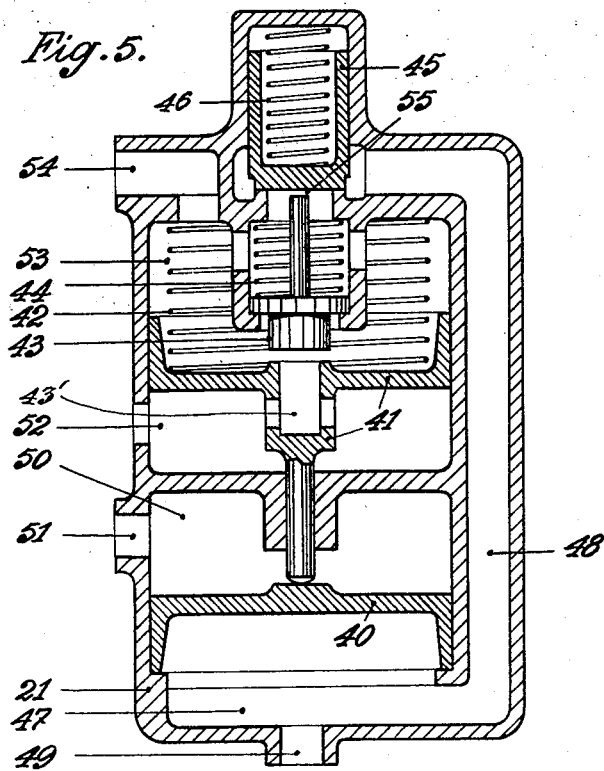
Figure 5 is a sectional view of an emergency valve for trailers comprising the invention.

As shown in Figure 1, the arrangement of trailer brake system carried on the tractor is; a compressor 10, supplying a main reservoir 11 through a pipe system 12, in which is situated an oil separator 13, and a pressure regulator 14. A reaction distributor 15 controlled by a brake pedal 9 is connected on the one hand to the reservoir 11 and on the other hand to the pipe system 17 in which is situated a stop valve 18. A flexible pipe 19 connects the pipe system 17 to the trailer.

The trailer mechanism comprises an auxiliary reservoir 20 connected on the one side to the pipe 17 through a non-return valve 20A and on the other side to an emergency valve 21 which in its turn is connected by means of a three-way valve 22 to the pipe system 17. The brake cylinders 23 and 24 of the trailer are connected by a pipe system 25 to the emergency valve 21.

As shown in Figures 2 to 4, the reaction distributor 15 constructed according to the invention comprises an escape valve 26 and its spring 27; an admission valve 28, a piston 29 constituting the seating of this admission valve 28, a gudgeon pin 30, body of the piston 29 a shaft 31 upon which are keyed an interior lever 32 and an exterior lever 33; a return spring 34 and a drag spring 35.

The chamber situated at the left of the piston 29 is rendered air-tight where the shaft 31 (Figure 3) passes through by means of a washer 36 of elastic material interposed between the distributor boss and the shoulder in a side of the shaft 31. The shaft is held against the washer 36 by means of the spring 37.

The air under pressure from the main reservoir 11 (Figure 1) enters the distributor 15 through pipe 16. The main pipe system is connected through 17 to the distributor which has an exhaust 38 to the atmosphere.

During normal running (brakes released) the position of the various parts described is as follows:

The escape valve 26 is closed and held on its seating by the action of spring 27. By virtue of the position of the piston 29 the admission valve 28 is open and the main reservoir is in direct connection with the main pipe system. There is a space 39, the purpose of which will be explained later, between the valves 26 and 28. Under the action of spring 34, the exterior lever 33, tends to move towards the right and thus maintains through interior lever 32 and gudgeon pin 30, piston 29 in firm contact against the body of the distributor 15. Spring 35 between the brake pedal and the distributor is adjusted so that it gives no pull to the exterior lever 33.

The air pressure throughout the whole system, including the distributor, is the same as that in the main reservoir. Two faces of the piston 29 are therefore under the same pressure.

The reaction distributor works in the following fashion.

If pressure is applied to the brake pedal the exterior lever 33 then moves to the left which by means of an interior lever 32 and gudgeon pin 30 pulls the piston 29 also towards the left. Piston 29 then comes into contact with admission valve 28 which is then held against its seating. The chambers on both sides of the piston 29 are thereupon isolated from each other and communication between the main reservoir and the pipe system is cut off. The pressure, however, on both faces of the piston 29 is still the same. Now, as soon as the admission valve 28 comes into contact with its seating it becomes virtually a part of the piston 29. When piston 29 moves to the left, it will be seen that admission valve 28, after traversing the space 39 and coming into contact with escape valve 26 opens the exhaust hole 38. The compressed air escaping into the atmosphere causes a drop in pressure on the right side of the piston. Due to the difference in pressure on either side, piston 29 immediately moves towards the right. It acts then in the opposite direction to the driver's pressure. The driver is compelled, if he wishes to continue the braking action, to press harder on the pedal to keep piston 29 in position, so that the escape valve will remain open.

If the driver keeps his pedal in a constant pressure at any point of its travel, piston 29 due to the difference in pressure pointed out above and also in consequence of the spring 35 moves towards the right until escape valve 26 makes contact with its seat and thus closes the exhaust hole 38 and isolates the pipe system from the atmosphere. At this moment admission valve 28 and escape valve 26 being shut (Figure 4) piston 29 stops in a position of equilibrium. The pressure in the system then becomes stabilized and will remain in this condition so long as the pressure in the pedal does not vary.

The condition of equilibrium of piston 29 mentioned above can be defined as follows: to compensate the pressure acting upon the left face of the piston 29 due to the pressure from the main reservoir (a constant pressure through the continued action of the compressor) an additional force is required besides that from the pressure in the pipe system and this is provided by the driver acting on the brake pedal. Thus the more the pressure diminishes on the right side of the piston in the pipe system, the greater must be the pressure exerted on the pedal. In other words the reaction felt by the driver is dependent upon the dropping pressure in the general pipe system. This effort is transmitted to the distributor through the elastic connection provided by the spring 35.

In order that piston 29 may stop in a position of equilibrium it is absolutely necessary that admission and escape valves 26 and 28 should both be completely closed (Figure 4). When the space 39 no longer exists between the valves, piston 29 must always take up the same position which is carefully worked out. If by reason of its inertia, piston 29 passes beyond this position of equilibrium admission valve 28 is opened and causes unstable braking. It is in order to remedy this inconvenience that the space 39 is provided between the valves.

It has been pointed out that during braking, piston 29 is under a constant tendency towards the right due to the difference of pressure acting on the two faces. In consequence, if the driver releases the brake pedal, piston 29, by moving towards the right, first of all closes the escape valve 26 which isolates the pipe system from the atmosphere, and then opens the admission valve 28 after traversing the space 39. The general pipe system is again put into communication with the main reservoir and refilled from it. All the parts of the distributor re-assume their positions for normal working (Figure 2).

Figure 6:
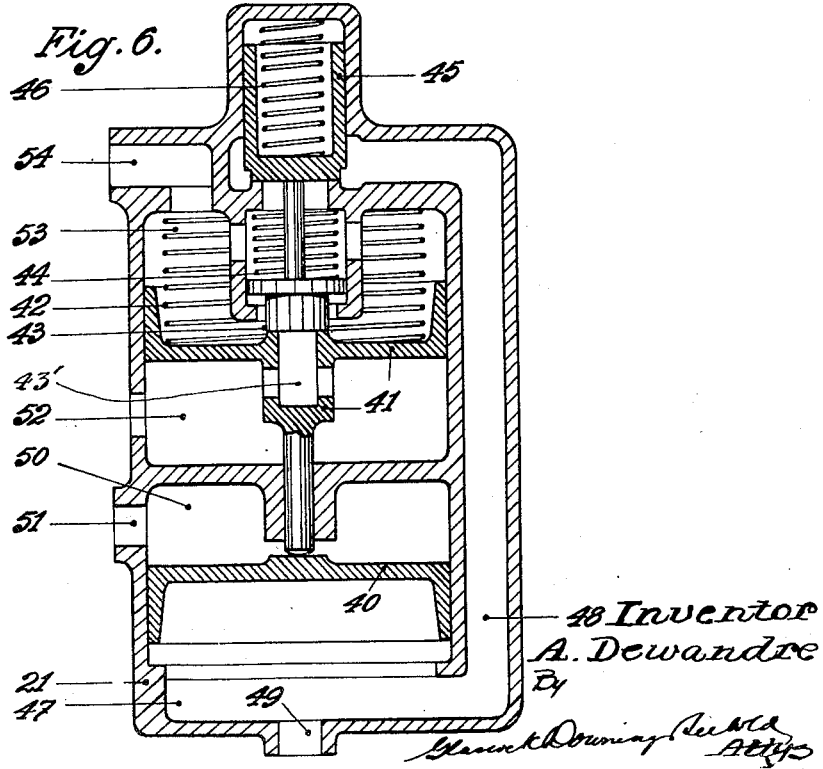
Figure 6 is a view similar to Figure 5 showing one of the valves in a modified position.

As is shown in Figures 5 and 6, the relay valve 21, which controls operation of the trailer brakes and which also serves as an emergency valve in case of accidental brakeway of the trailer, comprises a lower piston 40, an upper piston 41 working against the pressure of a spring 42 and constituting the seating for an escape valve 43, under the action of spring 44 and an admission valve 45 under the action of spring 46.

The chamber 47 and the passage 48 are connected through the orifice 49 to the auxiliary reservoir 20. The chamber 50 is connected by the opening 51 to the general pipe system 17 whilst the chamber 52 is in communication with the atmosphere and chamber 53 is connected to the piping of the brake cylinders 23 and 24 through the opening 54.

In normal working (brakes released) position of the various parts is as follows.

Piston 40 is held seated against the body of valve 21 under the pressure of the piston 41, which in turn is under the action of its spring 42. The escape valve 43, adapted to close passage 43' in piston 41, is held against the body of the valve 21 by its spring 44. Through the position of the piston 41, escape valve 43 is open and establishes in this way through chambers 52, passage 43', and chamber 53 communication between the atmosphere and the brake cylinders. The admission valve 45 is held on its seat by the action of a spring 46. A space 55 whose purpose will be explained later, is arranged between the escape valve 43 and the admission valve 45.

Through the intermediary of non-return valve 20A, the pipe system 17 supplies, during normal running, auxiliary reservoir 20. The air pressure in chambers 47 and 50 is thus the same. Since both faces of the piston 40 are under the same pressure, the piston is perfectly balanced. Chambers 52 and 53 being in communication with the atmosphere both faces of piston 41 are under atmospheric pressure and the piston is only being acted upon by its spring 42 pressing it against piston 40.

The working of the emergency valve is as follows:

Through the action of the reaction distributor situated on the tractor a fall of pressure takes place in the general system. This shows in chamber 50, piston 40 due to the difference of pressure on both faces acts on piston 41 against the resistance of spring 42. Piston 41 is changing its position, contacts the escape valve 43, which is pressed against its seating and in so doing interrupts communication between chambers 52 and 53. The brake cylinder is thus isolated from the atmosphere. The two faces of piston 41 are still under atmospheric pressure. As soon as valve 43 is resting on its seating it becomes part of piston 41. If the movement of the latter is observed, it will be seen that escape valve 43, after travelling over space 55, acts in its turn upon admission valve 45, which opens, and through the intermediary of chamber 47, piston 48 and chamber 53 puts auxiliary reservoir 20 into communication with the cylinders 23 and 24 for applying the trailer brakes.

Chamber 53 being under the pressure of the compressed air from the auxiliary reservoir, piston 41 immediately moves in the opposite direction to that taken when acted upon by the piston 40. If one wishes to continue the braking action further the pressure in the pipe system must be allowed to drop still further and by so doing in chamber 50 to allow piston 40 to resist the action of piston 41 and holds the admission valve 45 in the open position. Thus during the braking action, piston 41 has a constant tendency to force piston 40 back to its starting point.

If the driver through the distributor aperture 15 maintains a constant pressure in the system 17, piston 41 due to the unequal pressure caused by the always increasing force of the compressed air in chamber 53, neutralizes the action of piston 40 and moves until the admission valve 45 comes into contact with its seating and interrupts the communication between auxiliary reservoir 20 and the brake cylinders. At this moment the admission valve 45 and escape valve 43 both being shut (Figure 6) piston 41 stops in a position of equilibrium. From this moment the braking is stabilized and will remain thus so long as the pressure existing in the system does not vary.

The state of equilibrium of piston 41 may be defined as follows; the pressure exerted on the piston 41 by the pressure of the compressed air acting in chamber 53 must be compensated by the difference of the pressures acting on both faces of the piston 40 which is subjected on the one hand to the pressure of the compressed air of the auxiliary reservoir, and the pressure existing in the pipe system. Thus, the more the pressure of the compressed air increases in the brake cylinders and through this in the chamber 53, the greater must be the drop in pressure in the pipe system. Which means that the action of the brake cylinders is dependent on the drop in pressure in the general pipe system 17.

In order that piston 41 may stop in a position of equilibrium, escape valve 43 and admission valve 45 must be completely closed (Figure 6). When the space 55 no longer exists between the valves, piston 41 must always assume one position only which has been determined. If, by reason of its inertia piston 41 travels beyond this position of equilibrium, escape valve 43 opens and causes unstable braking. It is to prevent this that space 55 is provided between the valves 43 and 45.

It has been pointed out that during the braking action, piston 41 constantly opposes the action of piston 40. As a result, if through the action of the reaction distributor on the tractor, normal working pressure is re-established in the system, piston 40, the two faces of which are under the same pressure once more, re-assumes its initial position. Piston 41 under the action of the compressed air still acting in chamber 53 rejoins piston 40 and causes first the closing of the admission valve 45 thus isolating the brake cylinders from the auxiliary reservoirs 20, and next, after moving across the space 55, opens the escape valve 43, allowing the compressed air in the brake cylinders to escape. The brakes on the trailer are then released and the working parts of the emergency valve re-assume their normal positions (Figure 5).

It has been pointed out that, in order to brake the trailer a drop in pressure is brought about in the pipe system. Should the couplings break, the compressed air in the system escapes entirely into the atmosphere, the braking action is then maximum and the trailer is instantly and automatically halted. In the working of the distributor fitted on the tractor it has been pointed out that the reaction felt by the driver is a measure of the drop in pressure of the general system. It has also been demonstrated in the working of the emergency valve situated on the trailer that the action of the brake cylinder is also dependent on the fall in pressure of the pipe system. It may be concluded therefore, that the force applied to the brake pedal is a measure of the braking action. The harder the pedal is pressed, the greater will be the braking action on the trailer. In other words the driver can adjust the braking action as he pleases and maintain a perfect control over the brakes. The same effects hold good when slackening the brakes is required so that, adjustment is possible both in braking and slackening.

What I claim is:

In a distributor for automatic compressed air brake systems for trailers, forming an emergency valve for trailers, comprising in combination with an auxiliary reservoir, the general pipe system and the pipes of the brake cylinders, a first cylinder, a piston in said cylinder to be submitted on the one hand to the pressure in the auxiliary reservoir, and on the other hand to the pressure in the general pipe system, a second cylinder, a piston in said second cylinder, a spring opposing to the displacements of the latter piston, a first chamber formed on one side of this piston and communicating with the atmosphere, a second chamber formed on the other side of this piston and communicating with the pipes of the brake cylinders, means for actuating the piston of said second cylinder when the piston of said first cylinder is moved, an opening in the piston of said second cylinder to establish the communication between the chambers formed on both sides of the latter piston, a first valve in said second cylinder and which is normally open, to co-operate with said opening when the piston in the second cylinder is displaced, an opposing spring acting on said valve, an opening in said second chamber to establish the communication between said second chamber and the auxiliary reservoir, a second valve for normally closing this opening, a spring acting on said second valve, and a connection with limited play between said first and second valves.

ALBERT DEWANDRE.

REFERENCES CITED

The following references are of record in the file of this patent:

UNITED STATES PATENTS

| Number | Name | Date |
| --- | --- | --- |
| 1,541,913 | Bartholomew | June 16, 1925 |
| 1,585,819 | Barty et al. | May 25, 1926 |
| 1,890,087 | Kasantzeff | Dec. 6, 1932 |
| 2,099,263 | Farmer | Nov. 16, 1937 |
| 2,267,122 | McWhirter | Dec. 23, 1941 |
| 2,281,138 | Christensen | Apr. 28, 1942 |